(12) United States Patent
Marks

(10) Patent No.: US 7,551,787 B2
(45) Date of Patent: Jun. 23, 2009

(54) ADAPTIVE COMPRESSION QUALITY

(75) Inventor: Laurence V. Marks, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 10/353,765

(22) Filed: Jan. 28, 2003

(65) Prior Publication Data

US 2004/0146214 A1 Jul. 29, 2004

(51) Int. Cl.
*G06K 9/36* (2006.01)
*G06K 9/46* (2006.01)

(52) U.S. Cl. ...................................... 382/239

(58) Field of Classification Search ........... 382/239
See application file for complete search history.

(56) References Cited

U.S. PATENT DOCUMENTS

| | | | |
|---|---|---|---|
| 5,398,066 A | 3/1995 | Martinez-Uriegas et al. | 348/393 |
| 5,412,427 A | 5/1995 | Rabbani et al. | 348/394 |
| 5,625,712 A * | 4/1997 | Schoenzeit et al. | 382/232 |
| 5,677,689 A | 10/1997 | Yovanof et al. | 341/50 |
| 5,680,129 A | 10/1997 | Weinberger et al. | 341/65 |
| 5,748,116 A | 5/1998 | Chui et al. | 341/50 |
| 5,819,215 A | 10/1998 | Dobson et al. | 704/230 |
| 5,838,818 A | 11/1998 | Herley | 382/166 |
| 5,907,619 A | 5/1999 | Davis | 380/23 |
| 6,009,201 A | 12/1999 | Acharya | 382/232 |
| 6,038,346 A | 3/2000 | Ratnakar | 382/239 |
| 6,044,177 A | 3/2000 | Herley | 382/233 |
| 6,128,413 A | 10/2000 | Benamara | 382/251 |
| 6,195,462 B1 * | 2/2001 | Bryniarski et al. | 382/239 |
| 6,263,106 B1 | 7/2001 | Yamagata | |
| 6,301,392 B1 * | 10/2001 | Acharya | 382/239 |
| 6,735,341 B1 * | 5/2004 | Horie et al. | 382/239 |
| 6,885,395 B1 * | 4/2005 | Rabbani et al. | 348/231.1 |
| 6,931,159 B2 * | 8/2005 | Ridge | 382/246 |

(Continued)

FOREIGN PATENT DOCUMENTS

EP 798665 A2 10/1997

(Continued)

OTHER PUBLICATIONS

IBM Technical Disclosure Bulletin, vol. 37, No. 04B, entitled "Algorithm to Allow a Computer System's BootROM in Compressed Form", Apr. 1994, pp. 571-572.

(Continued)

*Primary Examiner*—Matthew C Bella
*Assistant Examiner*—Yuzhen Ge
(74) *Attorney, Agent, or Firm*—Patrick J. Daugherty; Driggs, Hogg, Daugherty & Del Zoppo Co, LPA (57) ABSTRACT

Images are captured and are stored (either in compressed or non-compressed form) in non-volatile storage at a predetermined quality or Q level. When the storage fills to a predetermined threshold, some or all of the images are compressed or recompressed to a lower quality, to make room for additional storage; i.e. new images may be captured and compressed at this lower quality or Q level, to minimize the rate at which the remaining storage is consumed; or all of the captured and stored images may be compressed or recompressed to this lower quality or Q level.

30 Claims, 6 Drawing Sheets

U.S. PATENT DOCUMENTS 6,934,418 B2 * 8/2005 Okada .................... 382/240
6,999,626 B2 * 2/2006 Andrew .................. 382/235

FOREIGN PATENT DOCUMENTS

| GB | 2339989 A | 2/2000 |
|---|---|---|
| JP | 08214058 A | 8/1996 |
| JP | 2000200284 A | 7/2000 |
| WO | WO 9900762 A1 | 1/1999 |

OTHER PUBLICATIONS

Institution of Electrical Engineers Journal, vol. 5, No. 6, entitled "Dynamic adaption in an image transcoding proxy for mobile Web browsing", Han et al, 1998, pp. 8-17.

Institution of Electrical Engineers Journal, Catalog No. 98TB100225, entitled "Lossless compression of pre-press images using linear color decorrelation", Storer et al, 1998, pp. 578.

* cited by examiner

ADAPTIVE COMPRESSION QUALITY

FIELD OF THE INVENTION

This invention relates generally to data compression and recompression and, more particularly, to a technique for incrementally storing additional images in a given storage area.

BACKGROUND INFORMATION

Compression associated with data, especially data in the form of images, generally is "lossy compression", although, as will be described presently; in some instances, "lossless compression" may be used. Standard well-known "lossy compression" techniques, such as JPEG, sacrifice fine details in the image to gain storage efficiency, minimizing file size. The degree of compression in the stored image is referred to as its "quality" or "Q" factor.

It is often the case that the amount of information to be stored exceeds the resource available to hold it. For example, a vacationing user may have a digital camera with one "FLASH ROM". If conditions are conducive to photography and opportunities are abundant, the photographer may fill the non-volatile storage before the vacation is completed. If new opportunities for photographs present themselves, the photographer must decide whether to delete images to make room for others.

It is, therefore, an object of this invention to provide a technique (method, system, apparatus, article of manufacture, signal-bearing media) to adaptively adjust compression quality of data to permit the incremental storage into a predetermined space-of-objects, which may be lossily-compressed.

For expository purposes, the invention will be described in terms of a digital camera, i.e. a camera which records images as compressed files in a fixed-size non-volatile storage, although this should not be construed as limiting the scope of the invention. The invention can be practiced in any situation which allows for lossy data compression. It is also useful in some situations where lossy compression is not acceptable, but where a plurality of lossless compression schemes are available, the denser ones requiring more time or resource to execute. Although the storage described herein is customarily semiconductor non-volatile storage, the invention is not limited to that type; rotating magnetic (disk) storage, tape storage, or any other digital storage may be utilized.

SUMMARY OF THE INVENTION

Images are captured and are stored (either in compressed or non-compressed form) in non-volatile storage at a predetermined quality or Q level. When the storage fills to a predetermined threshold, all of the captured images and some or all of the subsequently captured images may be compressed or re-compressed to a lower quality or Q level; or, alternatively, newer images may be captured at a lower quality or Q level to minimize the rate at which remaining storage is consumed.

DESCRIPTION OF THE PREFERRED EMBODIMENTS

Figure 1:
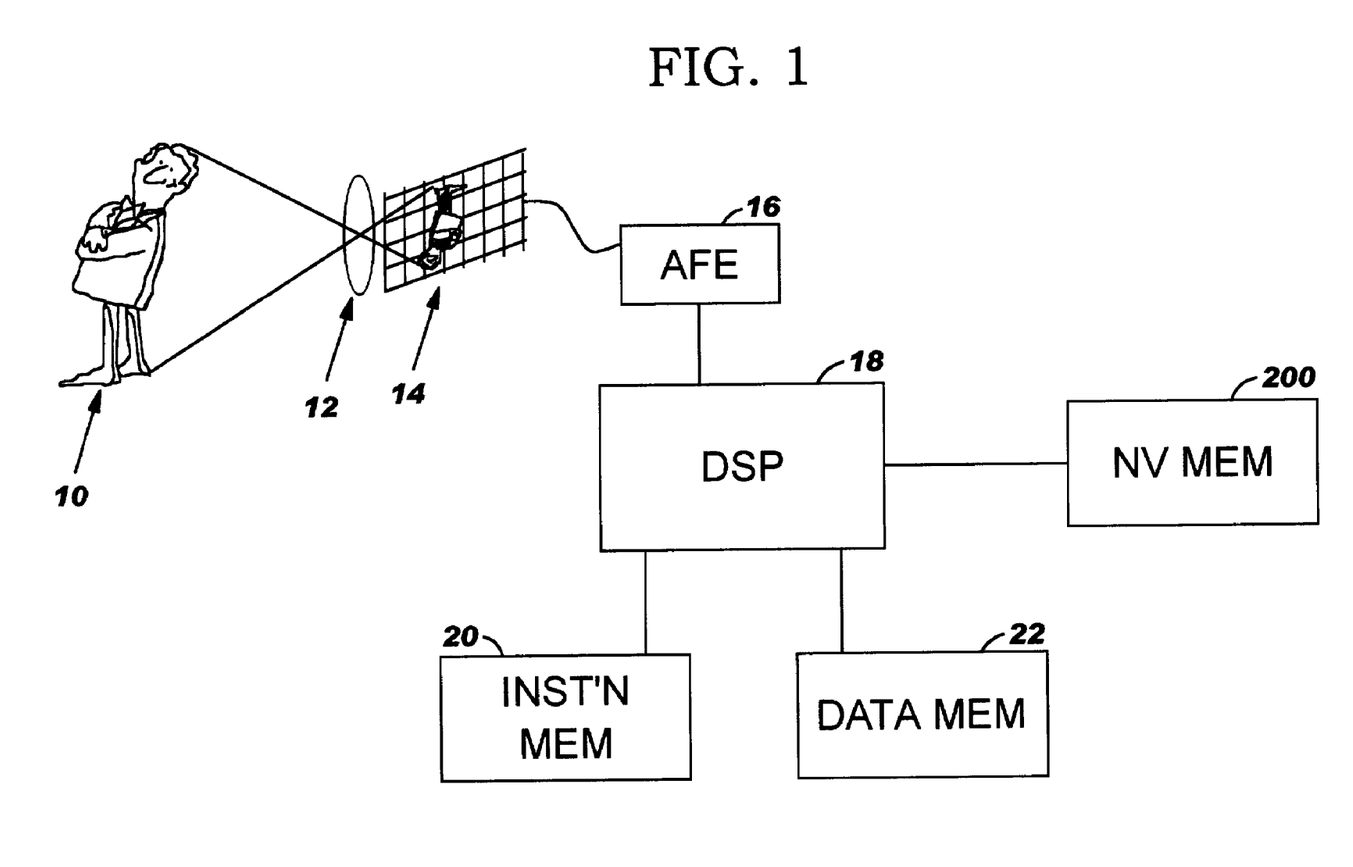
FIG. 1 is a conceptual representation of the operation of a digital camera.

Referring now to the drawings and, for the present, to FIG. 1, the operation of a digital camera is illustrated. Image 10 is imaged by lens 12 onto Charge-Coupled-Device (CCD) array 14. A CCD array is an array of cells. When the cells are exposed to light, each cell accumulates electrical charge proportional to the amount of incident light. After the image is captured, the cells may be operated like a shift register, i.e. to shift the charges to an Analog Front End (AFE) 16. Some CCD devices are constructed with red, green and blue filters over various cells, to sample the amount of light of each color, at each image point. One such device is the FTF3020-C Full Frame Image Sensor manufactured by Philips Semiconductors. The AFE 16 comprises a programmable gain amplifier and an Analog-to-Digital Converter (ADC). A typical AFE 16 is the HD49334NP produced by Hitachi, Ltd. The AFE 16 is controlled by a Digital Signal Processor (DSP) 18. The DSP 18 executes instructions in instruction memory 20 and causes the image content to be successively shifted out of the CCD array 14 and sampled (converted to digital form) by AFE 16. The digital data representing the captured image is stored in data memory 22. DSP 18 performs compression on the captured image data and stores the compressed image in non-volatile memory 200, also see FIG. 3.

Compression on color images is performed on three separate images captured as the red, green and blue contributions. Each is treated as a gray-scale image. DSP 18 can perform lossless or lossy compression.

Lossless compression may involve run-length encoding, which is well-known. Run-length encoding is performed by replacing a sequence of repeated identical values with one instance of the value and a count. A more advanced coding, Lempel-Ziv encoding, stores repeated sequences of values in a dictionary and makes reference to them by their dictionary indices. A suitable method is described in U.S. Pat. No. 4,814, 746 to Miller and Wegman, assigned to International Business Machines Corp., and incorporated herein by reference. When lossless compression is reversed, the decompressed data is identical to the original data prior to compression.

However, the invention in the preferred embodiment works best with lossy compression. The degree of compression can be varied, resulting in less or more loss of fine detail in the image and correspondingly greater or lesser size of the compressed image. In the well-known JPEG scheme, devised by the Joint Photographic Experts Group, the image is divided into blocks. The image data is transformed using the discrete cosine transform (similar to the Fourier transform) to the frequency domain. The result is a series of coefficients, the first representing the base (DC) intensity, and subsequent ones each representing intensity at finer levels of detail. An image of higher compression (and greater loss) has fewer coefficients in the series. Compression techniques in the JPEG format are shown and described in U.S. Pat. No. 5,677,689, dated Oct. 14, 1997, which is also incorporated herein by reference. When lossy compression is reversed, the decompressed data is not the same as the original data. Some detail, depending upon the degree of compression, will have been lost.

Figure 3:
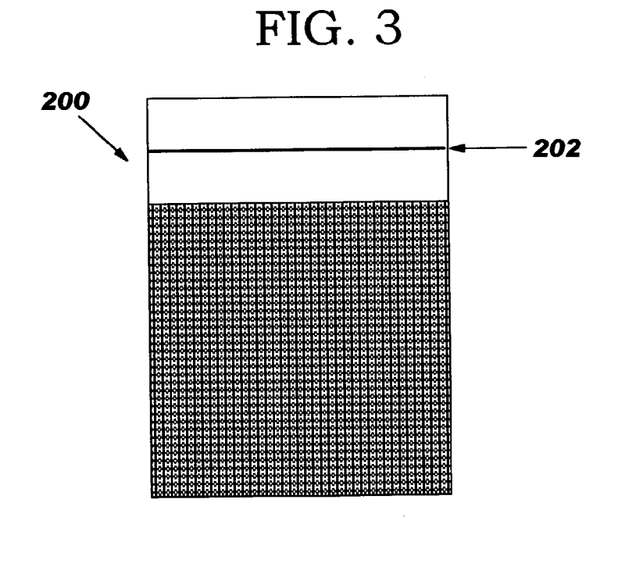
FIG. 3 shows storage partially filled with images compressed at a medium quality.

Image recompression with a higher compression factor may be performed by expanding the image from the compressed frequency-domain format (which resides in nonvolatile memory 200) into data memory 22 in image format, and then recompressing it at a higher compression factor. However, the preferred way to recompress the image is to recompress it directly in the frequency domain, by copying the data, while deleting higher order coefficients (in the JPEG format). Direct data recompression in the frequency domain is shown and described in U.S. Pat. No. 6,128,413 entitled Mapping Through Interval Refinement, incorporated herein by reference. The image may be manipulated directly in nonvolatile memory 200 or by copying it to data memory 22.

As indicated previously, the present invention will be described as it is embodied in a digital camera. However, there are many other uses to which this technique can be applied. For example, in recorded speech, a digital answering machine or other types of voice-mail re-compresses messages to make room for more messages. In recorded audio, an MP3 player, or a computer that loads it, could compress the audio a bit more to get more pieces onboard. (MP3 is itself lossy compression of sampled audio). In video, a motion video camera could recompress its data in a manner similar to a still camera. The technique of the invention can be used to compress other data that represents time-series; for example, digitized ECG waveforms.

In one embodiment for carrying out the invention, each image is stored in nonvolatile storage, uncompressed, as it is captured. Subsequently, storage is checked to see whether an adaptive threshold percentage or value of storage capacity, e.g. 90 percent, has been exceeded. If the uncompressed image exceeds this threshold value, the image is compressed by a Q1 factor so that the area it covers is lower than the threshold value, and then stored in storage at this Q1 compression factor. When a new image is captured, storage is checked to see if the storage of the new image would exceed the threshold value and, if not, then the new image is stored in the uncompressed form. If the threshold value is exceeded, then existing images are recompressed by a factor of Q2 and the new image is compressed either by a factor of Q1 or Q2. This continues until the compression has reached a given Qn level. The adjusting of the compression of Q factor is described in said U.S. Pat. No. 5,677,689. Also, the adjusting of a digital camera to store at a given Q factor is well known.

With respect to the amount of compression that can be effectively utilized, it is difficult to perceive the difference between an original 11 KB image and one compressed to 2 KB. In fact, it is difficult to even perceive a difference down to about 1.5 KB. Thus, compression in excess of 6:1 and even up to about 8:1 can be achieved without the significant loss of perceived clarity of image.

Figure 2:
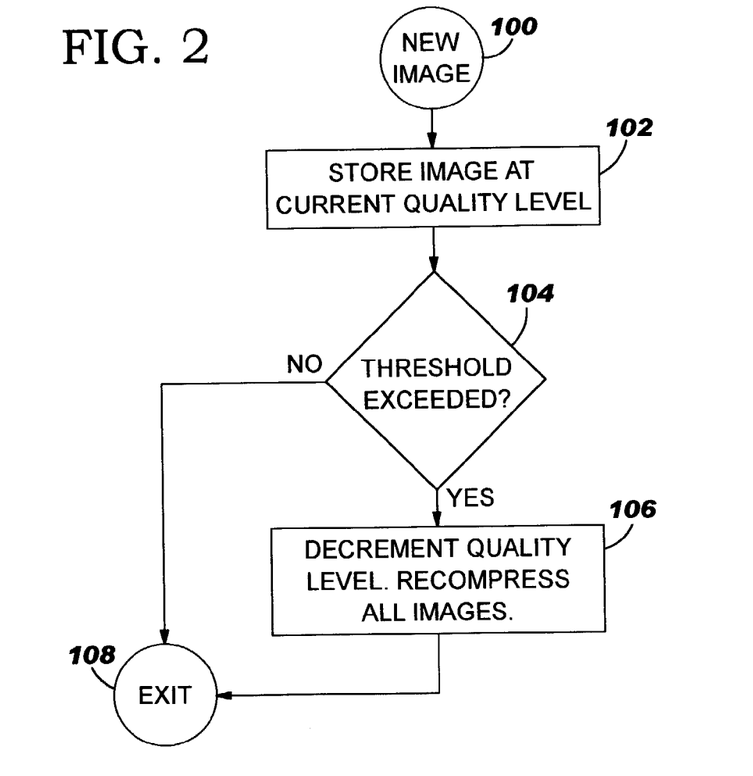
FIG. 2 shows a flow chart for processing to store an image.

This sequence, which is a signal in the form of a program or set of instructions for a computer contained on a medium, such as a magnetic disc or a semi-conductor chip, is depicted in the flow chart shown in FIG. 2. A new image is captured at 100. The image is stored at the current quality level in step 102. After the image is stored, the storage used is checked, as shown in step 104. If the threshold is not exceeded, the compression exits, at step 108. This condition is shown in FIG. 3, where 200 represents the non-volatile storage used, and 202 represents the threshold for reducing the quality or Qn of compression. If the threshold is exceeded when tested in step 104, then all the images are recompressed at a lower quality level Qx, as shown in step 106.

Figure 4:
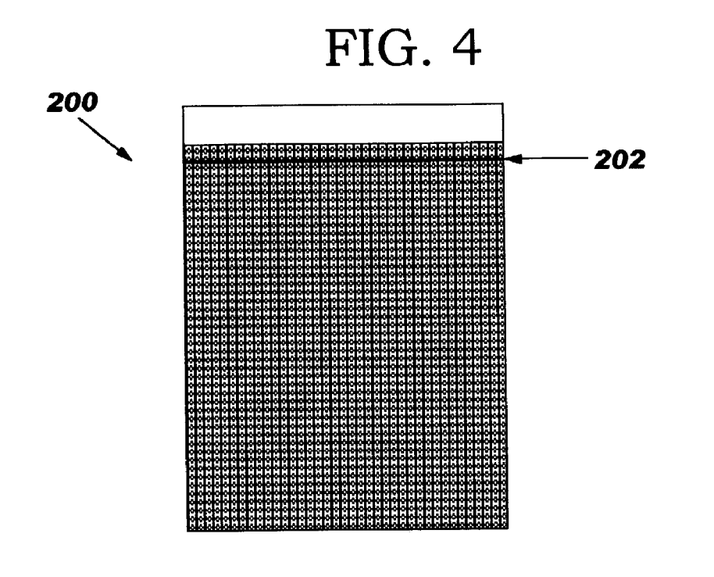
FIG. 4 shows the storage as an additional image is added which fills the storage past the adaptive compression threshold value.

FIG. 4 depicts the storage 200 shown in FIG. 3 after an additional image has been added and the threshold is exceeded after carrying out step 102. The storage used in non-volatile storage 200 exceeds threshold 202.

Figure 5:
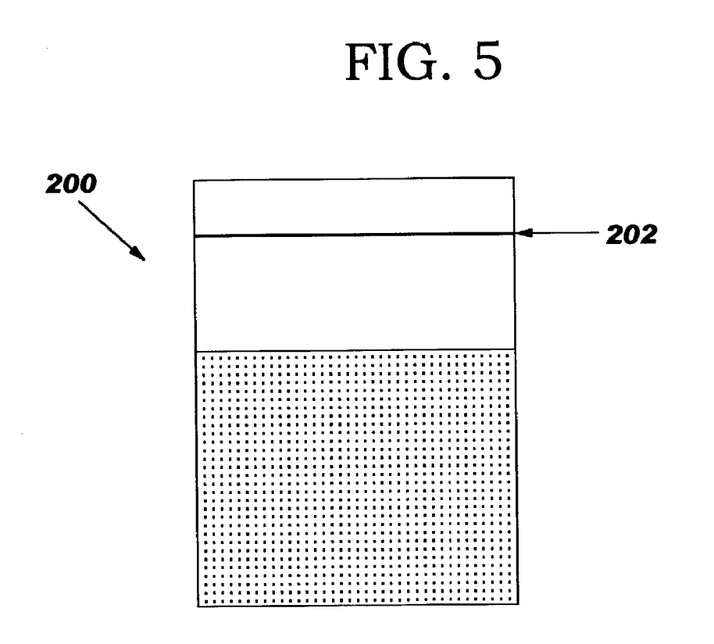
FIG. 5 shows the storage after the adaptive compression technique has operated and the images are re-stored at lower quality.

FIG. 5 depicts the storage 200 shown in FIG. 4 once the compression in step 106 has been carried out. Threshold 202 (e.g. 90 percent) is no longer exceeded, and the images are stored with less detail at a more compressed Qn Value. Storage use is reduced, and additional images may be stored before subsequent quality reduction is required.

Figure 6:
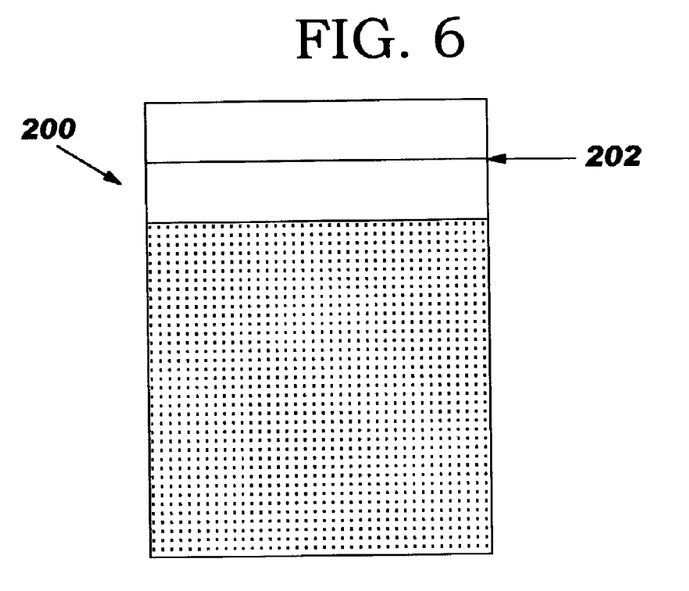
FIG. 6 shows the storage after an additional image has been stored.

FIG. 6 shows the condition of the storage 200 shown in FIG. 5 after an additional image has been stored. The compression process 106 may be carried out starting out with the images stored lowest in storage 200, with each successive image being copied lower in storage as space is made available from the previous image, or by other techniques, such as using free storage at the top of storage 200 (above threshold 202) or by using another storage device for intermediate storage, or by compressing each image in place and storing new images in fragmented storage.

Figure 7:
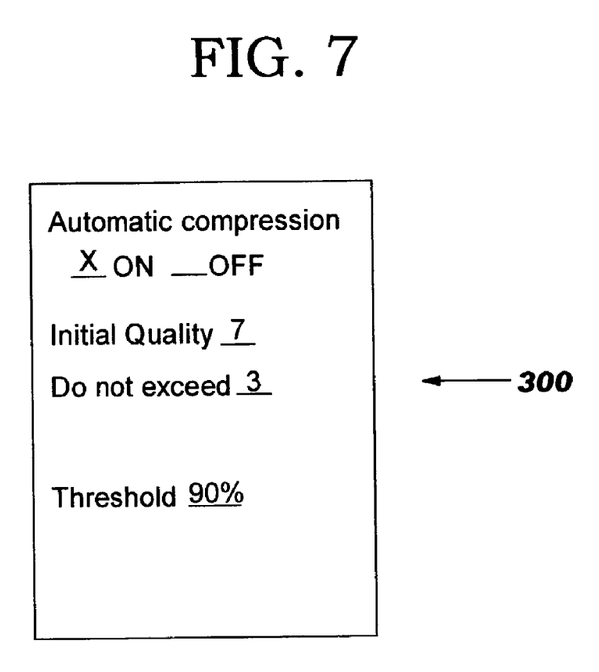
FIG. 7 shows a user interface screen where the user may select adaptive compression and establish defaults.

FIG. 7 shows a screen 300 which may be presented to a user to select whether adaptive compression is used, which quality level to initially use, and the lowest quality level the user will accept. This prevents the user from inadvertently storing too much information and reducing quality below an acceptable value. The user may also set the threshold higher (i.e. higher than 90 percent), which higher threshold will cause more frequent compression once exceeded. A lower threshold will cause compression sooner, reducing quality sooner.

There are alternate modes for practicing the present invention in which the steps may be carried out in another sequence. As each image is captured, the threshold is tested. If threshold is exceeded, the quality level is reduced and all stored images are re-compressed before the current image is stored. This method is inferior in some circumstances because it requires processing before the current image is stored, which may interfere with an immediately-subsequent capture. The method depicted in FIG. 2 is more amenable to compression via "background processing" once all images are safely stored.

FIGS. 8-11 represent an alternate mode for practicing the present invention. (FIG. 8 also represents a program or set of instructions for a computer contained on a medium, such as a magnetic disc, or a semi-conductor chip.) In this mode, captured images are never re-compressed. One or more thresholds are defined and, as each threshold is exceeded, new images are captured and compressed at successively lower quality levels.

Figure 8:
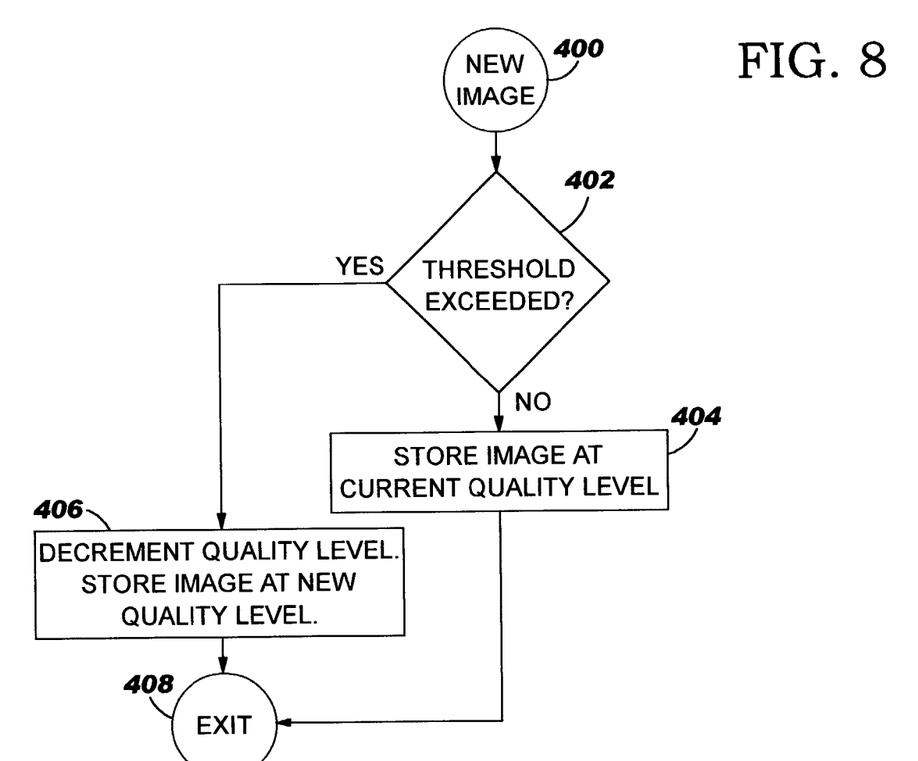
FIG. 8 shows a flow chart of an alternate embodiment in which the quality of captured images is not revised, but new images are stored at progressively lower qualities as successive thresholds are crossed.

With reference to FIG. 8, after each image is captured at step 400, the threshold is tested at step 402. If the pre-set threshold is exceeded, the quality or Qn level is reduced and the current image and all subsequent images are stored at the new quality level at step 406. The process is exited at step 408, regardless of whether the threshold was exceeded.

Figure 9:
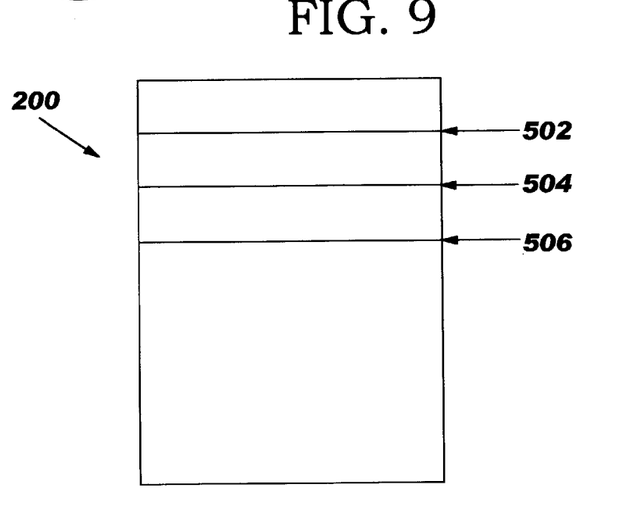
FIG. 9 shows empty storage with quality adjustment threshold values.

FIG. 9 depicts storage 202 with several thresholds 502, 504, and 506 at which quality is to be successively reduced.

Figure 10:
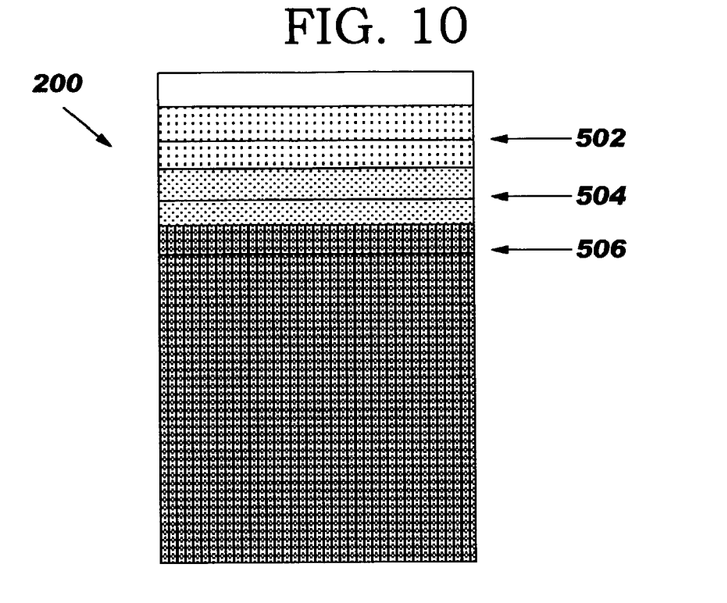
FIG. 10 shows storage after images have been captured, where the alternate embodiment technique has been utilized.

FIG. 10 depicts the storage and thresholds once images have been captured, using the alternate technique shown in FIG. 8. In FIG. 10, images captured after each threshold is exceeded are first captured and then reduced to lower quality or Q levels.

Figure 11:
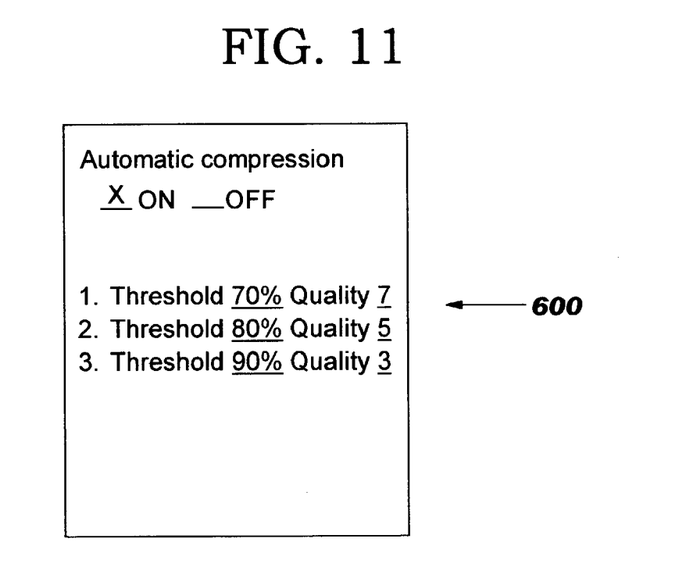
FIG. 11 shows a user interface screen where the user may select adaptive compression and establish defaults for the alternate embodiment.

FIG. 11 depicts a screen 600 presented to a user that can be used to configure a device utilizing the alternate embodiment.

What is claimed is:

1. A method of storing multiple captured images in digital form in a digital camera, comprising the steps of:
   a. capturing a first image in a predetermined digital form with said digital camera,
   b. providing a digital storage device having a finite storage capacity for storing said images in said digital form in said digital camera,
   c. storing said captured first digital image in a first format in a first portion of said storage device,
   d. setting a threshold value on the percentage of available storage space used to store images in said storage device,
   e. capturing a second image in digital form,
   f. determining if the percentage of storage space needed to store said first and second images exceeds said threshold value,
   g. if the space needed to store said first and second images exceeds said limit, then automatically compressing at least one of said images and storing all of said images, including all of said compressed images, in said storage device, wherein for each subsequent image that is captured, if space needed to store the already saved images and the subsequently captured image exceeds said limit, then at least one of said stored images is automatically recompressed and the subsequently captured image is compressed, and all of said images are stored in said storage device.

2. The invention as defined in claim 1 wherein the recompression includes recompressing said stored images in the frequency domain.

3. The invention as defined in claim 2 wherein the recompression includes expanding said images from the frequency domain to the image domain and recompressing said images in the image domain.

4. The invention as defined in claim 1 wherein a selector is provided to select which image or images in digital form are to be compressed.

5. The invention as defined in claim 1 wherein each image is compressed in step g.

6. The invention as defined in claim 1 wherein the second image is compressed in step g.

7. The invention as defined in claim 1 wherein the compression in step g is lossy compression.

8. The invention as defined in claim 1 wherein the compression in step g is lossless compression.

9. The invention as defined in claim 1 wherein step d is repeated based on the percentage of storage available as determined in step f.

10. The invention as defined in claim 9 wherein the total percentage of compression has a maximum value.

11. A camera that stores multiple captured images in digital form, comprising:
   a. structure to capture an image in a predetermined digital form,
   b. a digital storage device having a finite storage capacity operatively connected to said structure to capture said image for storing said images in said digital form,
   c. a structure for delivering a captured first digital image in a first format to a first portion of said storage device,
   d. a device for setting a threshold value on the percentage of available storage space used to store images in said storage device,
   e. a device for determining if the percentage of storage space needed to store said first and a second captured image exceeds said threshold value,
   f. a device for automatically compressing at least one of said images and storing all of said images, including all of said compressed images, in said storage device if the space needed to store said first and second images exceeds said threshold value, wherein the device for compressing said images automatically recompresses at least one of said stored first and second images if the space needed to store said first and second images and a newly captured image exceeds said threshold value.

12. The invention as defined in claim 11 further including a component to capture and store audio in the predetermined digital form, wherein said audio is automatically compressed and recompressed with said stored images.

13. The invention as defined in claim 12 wherein the compression in step f constitutes a second compressed mode.

14. The invention as defined in claim 11 wherein a selector is provided to select which image or images in digital form are to be compressed.

15. The invention as defined in claim 11 wherein each image is compressed in step f.

16. The invention as defined in claim 11 wherein the second image is compressed in step f.

17. The invention as defined in claim 11 wherein the compression in step f is lossy compression.

18. The invention as defined in claim 11 wherein the compression in step f is lossless compression.

19. The invention as defined in claim 11 wherein step d is repeated based on the percentage of storage available as determined in step e.

20. The invention as defined in claim 19 wherein the total percentage of compression has a maximum value.

21. A computer readable medium in a digital camera containing instructions for storing multiple captured images in digital form, comprising the steps of:
   a. capturing a first image in a predetermined digital form,
   b. storing said captured first digital image in a first format in a first portion of a storage device in the digital camera,
   c. setting a threshold value on the percentage of available storage space used to store images in said storage device,
   d. capturing a second image in digital form,
   e. determining if the percentage of storage space needed to store said first and second images exceeds said threshold value,
   f. if the space needed to store said first and second images exceeds said limit, then in the digital camera automatically compressing at least one of said images and storing all of said images, including all of said compressed images, in said storage device, wherein for each subsequent image that is captured, if the space needed to store the already saved images and the newly captured image exceeds said limit, then at least one of said stored images is automatically recompressed and the newly captured image is compressed, and all of said images are stored in said storage device.

22. The invention as defined in claim 21 further including: capturing at least a third image in digital form;
determining if the percentage of storage space needed to store said first, second, and at least third images exceeds said threshold value, if the space needed to store said first, second, and at least third images exceeds said limit, then automatically recompressing at least one of said first and second images to a different compression degree and automatically compressing said at least third image, and storing all of said images, including all of said recompressed and compressed images, in said storage device.

23. The invention as defined in claim 22 wherein the compression in step f constitutes a second compressed mode.

24. The invention as defined in claim 21 wherein a selector is provided to select which image or images in digital form are to be compressed.

25. The invention as defined in claim 21 wherein each image is compressed in step f.

26. The invention as defined in claim 21 wherein the second image is compressed in step f.

27. The invention as defined in claim 21 wherein the compression in step f is lossy compression.

28. The invention as defined in claim 21 wherein the compression in step f. is lossless compression.

29. The invention as defined in claim 21 wherein step c is repeated based on the percentage of storage available as determined in step e.

30. The invention as defined in claim 29 wherein the total percentage of compression has a maximum value.

* * * * *